United States Patent Office 3,383,166
Patented May 14, 1968

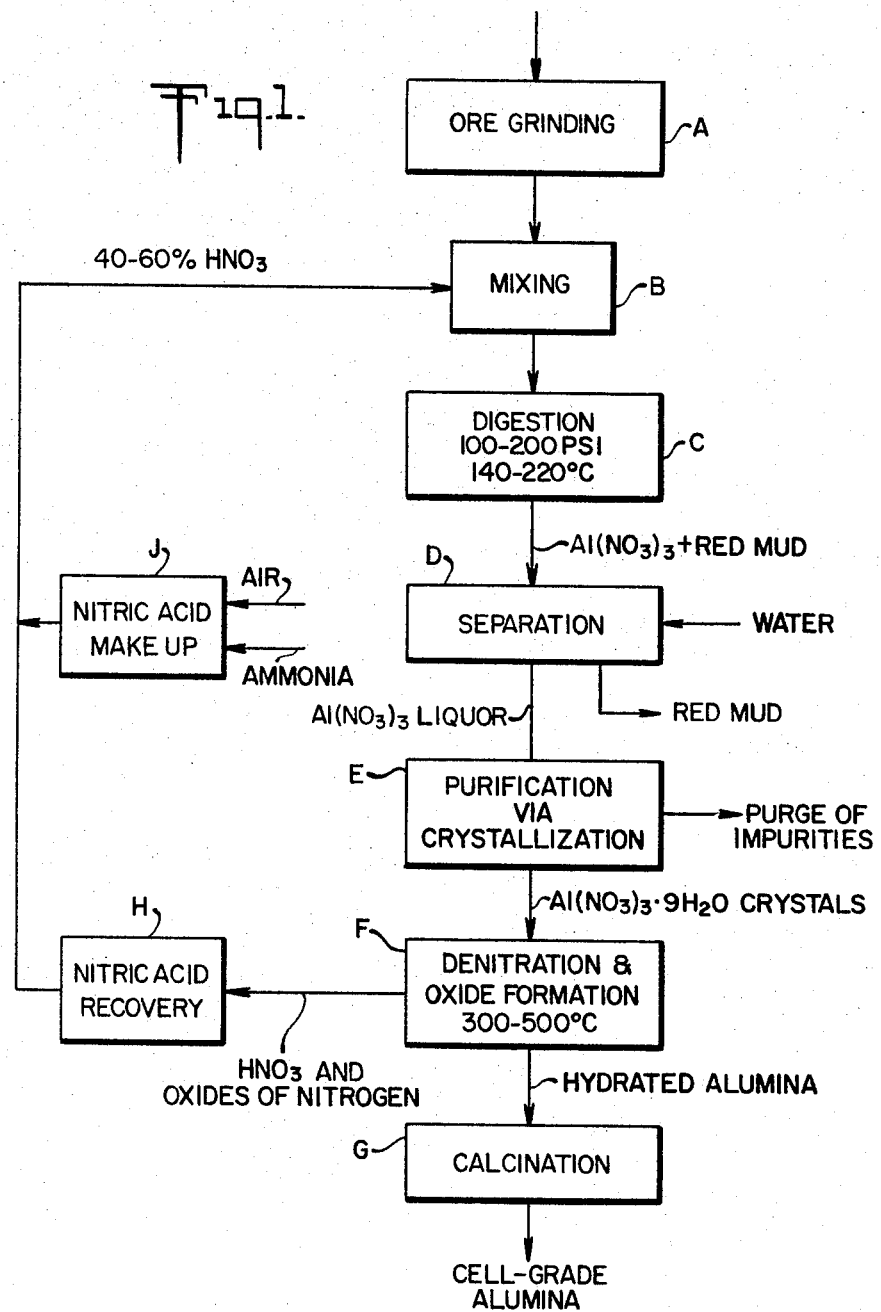

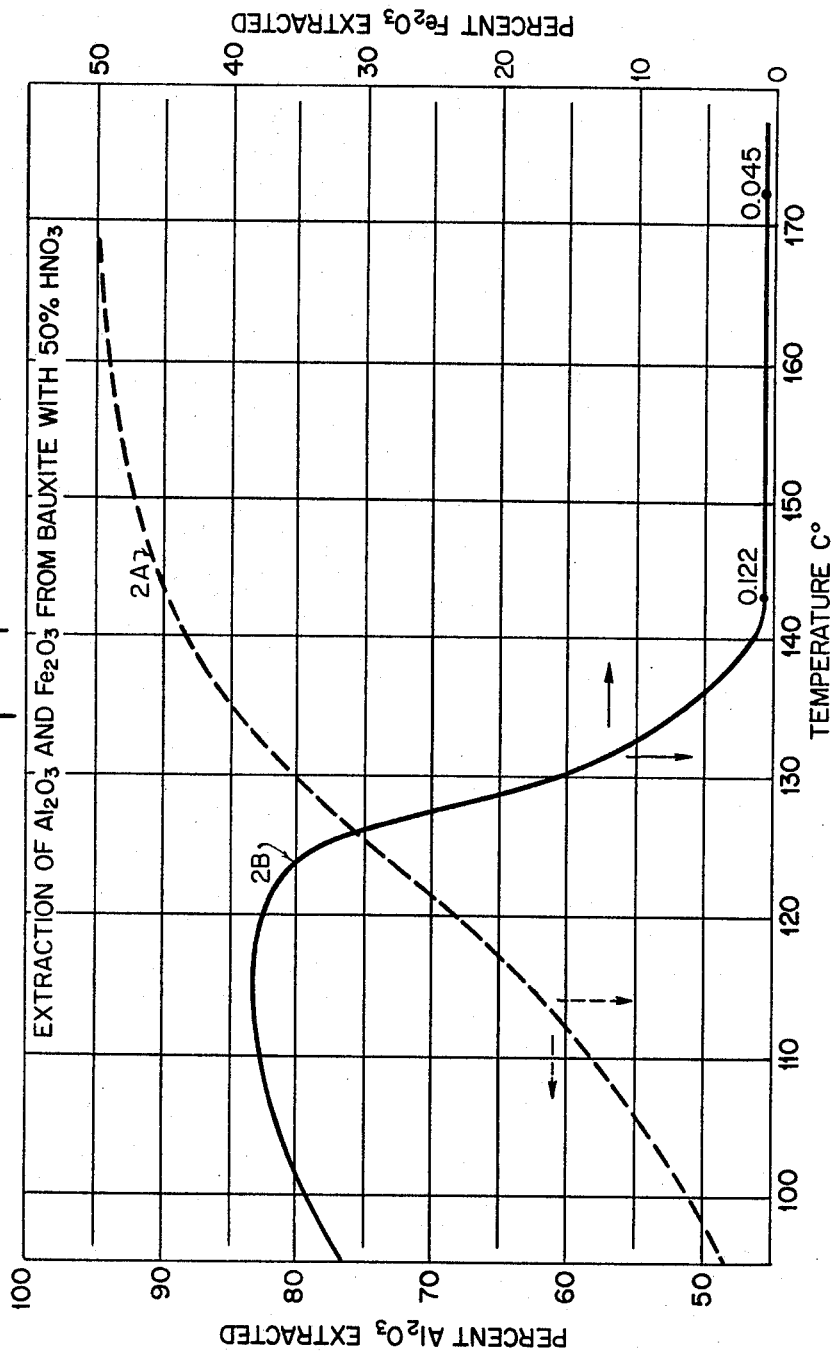

3,383,166
PROCESS FOR PRODUCING IRON-FREE
ALUMINUM NITRATE SOLUTIONS
Harold T. Gerry, Petersburg, Va., Carl K. Amano,
Denver, Colo., and Anthony W. Yodis, Whippany,
N.J., assignors to Allied Chemical Corporation, New
York, N.Y., a corporation of New York
Filed Aug. 17, 1964, Ser. No. 390,141
3 Claims. (Cl. 23—192)

ABSTRACT OF THE DISCLOSURE

Process for production of aluminum nitrate solutions having a ratio of $Al_2O_3$ to $Fe_2O_3$ of at least about 2,000 which comprises heating at temperatures above 140° C. iron-contaminated aluminum nitrate solutions containing free $Al_2O_3$ in the presence of at least about 0.10 part $Fe_2O_3$ per part $Al_2O_3$ for a period sufficient to precipitate substantially all the iron.

---

This invention relates to a process for the production of cell grade alumina from aluminous substances of varying grades, and more particularly to the production of iron-free aluminum nitrate solutions from iron-containing aluminous ores by a controlled single stage digestion with aqueous nitric acid.

Cell grade alumina, that is, alumina of the high purity required for reduction to aluminum metal in electrolytic cells, has been produced in the past, principally from high grade bauxites containing high proportions of aluminum and low proportions of silica and iron, by digesting with caustic alkalis according to the well known Bayer process.

Such processes are not well adapted to the extraction of alumina from ores containing large percentages of silica and/or iron, and for treatment of such ores, various acid extraction processes have been proposed, including extraction with nitric acid. The nitric acid extraction process as heretofore practiced has produced aluminum nitrate solutions contaminated with high proportions of iron which, unless subjected to further expensive purification steps, produced aluminas containing iron in excess of the minimum permissable quantities specified for "cell grade" alumina, usually less than about 0.05% iron preferably less than about 0.02% iron as $Fe_2O_3$, based on the $Al_2O_3$ content, or a ratio of $Al_2O_3$ to $Fe_2O_3$ of at least about 2,000.

It is an object of the present invention to provide a process involving a single iron separation step for producing aluminum nitrate solutions of the low iron content required for the production of cell grade alumina, from either high or low grade aluminous ores, particularly from low grade ores such as clays and low grade bauxites.

These and other objects are accomplished according to our invention wherein aluminum nitrate solutions containing at least about 6% of aluminum compounds calculated as $Al_2O_3$, composed of aluminum nitrate and free $Al_2O_3$, the latter being present in an amount equal to at least about 1.0 part per 100 parts of $Al_2O_3$ combined as aluminum nitrate, are heated at temperatures between about 140° C. and about 220° C., preferably between about 160° C. and about 200° C., at autogeneous pressures in the presence of at least about .10 part of $Fe_2O_3$ per part of $Al_2O_3$ based on the total aluminum in the solution calculated as $Al_2O_3$, for a period sufficient to precipitate substantially all the iron in the aluminum nitrate solution, and the ratio of alumina to iron oxide in the aluminum nitrate solution is greater than about 2,000, and separating the solid precipitate from the liquid aluminum nitrate solution.

The aluminum nitrate solutions treated are obtained by leaching or digestion of the aluminous ore at elevated temperatures with aqueous nitric acid of between about 30% and about 60% concentration, the nitric acid being used in a quantity sufficient to provide not more than about 98% of the stoichiometric quantity of nitric acid theoretically necessary to convert all the alumina present in the ore to aluminum nitrate, for a period sufficient to completely exhaust the nitric acid charged and for a period sufficient to dissolve enough of the alumina values in the ore to leave no free nitric acid in the solution. The undissolved residue is then separated from the alumina solution, and alumina and nitric acid values are recovered from the aluminum nitrate solution.

For treating aluminous ores initially containing iron in quantities sufficient to provide the critical ratio of iron to alumina specified above, the ground ore is leached with nitric acid solution and heated at the digestion temperature for the required period in a single stage, usually complete in from about ½ to about 2 hours. This digestion dissolves a substantial proportion of alumina as aluminum nitrate, together with some free alumina but surprisingly leaves substantially all the iron in an insoluble form as alpha $Fe_2O_3$ hydrate. The temperature of digestion is critical since we have found that ferric nitrate is unstable in aqueous solution at temperatures above about 140° C. in the presence of substantial proportions of ferric oxide, and forms nitric acid and hydrated ferric oxide which is insoluble, whereas aluminum nitrate in aqueous solution under the same temperature conditions is essentially stable and remains in solution. The silica and other inert oxides remain undissolved.

In leaching aluminous ores as above described, it is necessary to carry out the digestion with a deficiency of nitric acid, i.e., less than the stoichiometric equivalent based on the equation

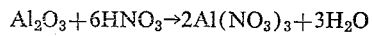

$$Al_2O_3 + 6HNO_3 \rightarrow 2Al(NO_3)_3 + 3H_2O$$

If quantities of nitric acid closely approaching the stoichiometric equivalent or in excess thereof are used, substantial quantities of iron are dissolved and thus contaminate the aluminum nitrate solution to such an extent that the alumina produced therefrom fails to meet the specifications required for cell grade alumina (less than 0.05% $Fe_2O_3$, i.e., a ratio of $Al_2O_3/Fe_2O_3$ in excess of about 2,000).

After digestion of the aluminum nitrate solution, the slurry is filtered or otherwise treated to remove iron oxide and undissolved silica, resulting in a virtually iron free aluminum nitrate solution.

To produce cell grade alumina, the aluminum nitrate solution is then concentrated, as by evaporation, the aluminum nitrate is crystallized as $Al(NO_3)_3 \cdot 9H_2O$, leaving impurities such as sodium, calcium, copper, magnesium and the like in the mother liquor, which is separated from the crystals. The aluminum nitrate crystals are then denitrated to form alumina, $Al_2O_3$, and to recover nitric acid values, for example by melting the crystals at say, about 85° C. in a melt tank and spraying the melt as a liquid into a fluid bed of alumina which is heated and maintained at about 400° C. The aluminum oxide, in the form of a partially hydrated aluminum oxide is drawn off and is calcined at about 1,000° C. or higher to form cell grade alumina.

The mother liquor from the crystallization step is denitrated in a separate fluid bed of alumina to recover the nitric acid values while the impure alumina is discarded.

The off gas streams from the above two denitration operations, containing $HNO_3$, oxides of nitrogen and steam are combined, and fed into a nitric acid scrubbing tower to recover the nitric acid as an aqueous solution of the desired concentration which is recycled to the digestion system.

In treating aluminous ores containing insufficient iron to provide at least the minimum proportion of $Fe_2O_3$ to $Al_2O_3$ necessary for effective removal of iron from solution, it is necessary to supply the deficiency of iron oxide before digesting at the critical temperatures indicated. Thus, according to one modification of our invention, there is added to the ground, low iron content ore, a quantity of iron oxide material sufficient to provide at least about .10 part $Fe_2O_3$ per part of aluminum, calculated as $Al_2O_3$ in the resulting mixture, and the resulting mixture is digested with nitric acid at the indicated temperatures as described above. While this procedure may be used with any of the commonly available low iron content ores it is most advantageously employed when treating ores which are relatively low in silica such as, for example high grade bauxite which often contains no more than about 2 to 3% silica.

However, for treating low iron content ores which are high in silica, such as for example, Georgia kaolin clay, which typically analyzes 36.6% $Al_2O_3$; 0.85 $Fe_2O_3$; and 40% silica, a preliminary leaching step is preferably carried out to remove the silica prior to the critical digestion step. In carrying out this step, the ground ore is preferably calcined, and is then leached with aqueous nitric acid of the indicated concentration and ratio of total nitric acid to alumina content of the ore, at temperatures of about 90° C. or above preferably between about 90° C. and about 120° C., and atmospheric pressure. Higher temperatures may be used but are not necessary for adequate solution of alumina. This treatment dissolves both aluminum and iron. The resulting slurry is filtered or otherwise treated to separate undissolved residue, mostly undissolved silica.

To the above solution, which contains aluminum and iron nitrates, is added a quantity of acid soluble iron oxide material sufficient to provide at least about .10 part $Fe_2O_3$ per part of aluminum calculated as $Al_2O_3$ in the resulting mixture. The iron oxide material may be added to the solution as above or to the original ore as previously indicated and may be supplied from any desired source for example, (a) iron bearing residue resulting from the nitric acid autoclave leaching of high iron bauxite, or (b) an iron compound produced by the thermal decomposition of iron nitrate, or (c) addition of an aluminous ore high in iron such as Jamaica bauxite. If the free $Al_2O_3$ in the solution at this point is below that required to react with all the nitric acid to be liberated by the decomposition of ferric nitrate in the digestion step, a quantity of $Al_2O_3$ is added, sufficient to provide at least a slight excess of free alumina after exhaustion of the nitric acid so produced.

The resulting iron oxide-containing aluminum nitrate-iron nitrate solution, is then digested at temperatures between about 140° C. and about 220° C. under autogeneous pressure until the alumina to $Fe_2O_3$ ratio in the solution is greater than about 2,000. Under the indicated temperature conditions and ratios of $Fe_2O_3$ to $Al_2O_3$ in the above mixture, the iron existing in solution as iron nitrate is precipitated, together with the added $Fe_2O_3$, as alpha $Fe_2O_3$ hydrate and is separated by filtration or other mechanical means. The separated iron oxide residue can be recycled if desired to a new batch of leach filtrate from the clay.

The weight ratio of $Fe_2O_3$ to $Al_2O_3$ in the digestion slurry is critical and iron oxide should be present in an amount of at least about 0.10 part by weight of $Fe_2O_3$ per part of $Al_2O_3$ in order to obtain adequate iron removal. Ratios as high as 1.5 to 1 or higher are operative; however, ratios of $Fe_2O_3/Al_2O_3$ between about 0.2 and about 0.5 are preferred.

The process of our invention is adapted to continuous or batch-wise operation, and for use with high or low grade bauxite ores and with many clays, particularly the kaolins. In order to provide an economic recovery of alumina, such ores should preferably contain at least about 6% alumina, and will usually have alumina contents ranging from about 30% to about 60%. In order to effect substantially complete iron elimination, the initial iron content should be high enough to provide at least about 0.10 part of $Fe_2O_3$ per part of alumina or should be supplemented with additional $Fe_2O_3$ to provide at least this amount. Silica content is not critical and our process is amenable to operation with high or low silica ores. The silica content of such ores will usually range between about 1% and about 20% for the bauxites and up to 40% or higher for the clays. In addition to the main constituents alumina, iron and silica, most aluminous ores contain smaller proportions of other impurities such as various metallic oxides inert to nitric acid and small proportions of alkali and alkaline earth metal compounds, for example, compounds of titanium, calcium, chromium, copper, nickel, sodium, manganese and magnesium. These impurities are also eliminated by our process.

Typical analyses of a number of clays and bauxites suitable for use in our process are shown below.

TYPICAL ANALYSIS OF SUITABLE ORES

| Type Ore | Percent | | |
|---|---|---|---|
| | $Al_2O_3$ | $Fe_2O_3$ | $SiO_2$ |
| Spanish Bauxite | 49.6 | 21.0 | 9.2 |
| Portland Hills, Oregon Bauxite | 38.6 | 34.4 | 1.26 |
| Salem Hills, Oregon Bauxite | 37.05 | 21.5 | 9.7 |
| Jamaican Bauxite | 49.4 | 20.2 | 0.85 |
| High Grade Bauxite | 61.0 | 0.94 | 2.90 |
| Kaolin Clay, Georgia | 36.6 | 0.85 | 40.0 |
| Arkansas Kaolin Clay High Alumina (Calcined) | 49.7 | 1.25 | 39.1 |
| Arkansas Bauxite Kaolin High Silica (Calcined) | 44.3 | 2.10 | 39.0 |

In the drawings, FIGURE 1 is a flow sheet showing schematically the several steps in our continuous process for producing cell grade alumina from low grade bauxite. FIGURE 2 illustrates the solubility curves of alumina, $Al_2O_3$, and iron oxide, $Fe_2O_3$, respectively, which dissolve from a bauxite containing 49.4% $Al_2O_3$ and 20.2% $Fe_2O_3$ when digested in 50% concentration of nitric acid at temperatures between 100° C. and 170° C.

In FIGURE 1, A denotes the ore grinding step, B denotes mixing of ground ore with $HNO_3$ solution, C denotes digestion of the nitric acid-ore slurry at elevated temperatures and pressures, D denotes dilution and separation of the aluminum nitrate solution from the silica and iron impurities, E represents the crystallization step in which the mother liquor containing soluble impurities is discarded, F represents the decomposition of $$Al(NO_3)_3 \cdot 9H_2O$$

crystals to alumina and nitrogen oxides. G is the final calcination step producing cell grade alumina; H and J represent recovered nitric acid and fresh make-up nitric acid respectively used to produce the required concentration of nitric acid for preparing the digestion slurry.

In FIGURE 2, curve 2A depicts the increasing concentration of dissolved $Al_2O_3$ with rising temperature upon digestion with 50% nitric acid solution between 100° C. and 170° C. of a bauxite ore initially containing about 50% $Al_2O_3$ and 20% $Fe_2O_3$. Curve 2B shows the decrease in concentration of soluble $Fe_2O_3$ with increasing temperature.

In carrying out the process according to our invention, aluminous ores are ground, preferably to a fineness such that at least about 75% passes a 200 mesh (Tyler) screen, for example, to −80 mesh (Tyler), and if desired, calcined by heating at elevated temperatures. In some ores, notably the clays, the alumina contents are rendered more soluble by a calcination treatment, others appear to benefit less from calcination. The ground ores are mixed with aqueous nitric acid solution of at least about 30% concentration, preferably between about 40% and about 60% concentration, in a quantity which supplies an amount of nitric acid less than that stoichiometrically equivalent to the alumina in the ore based on the equation set forth above, preferably between about 50% and about 90% e.g., between about 3 moles and about 5.4 moles of $HNO_3$ per mole of $Al_2O_3$. Smaller proportions of nitric acid result in inferior extractions of alumina from the ore, higher proportions promote greater solubility of the iron components of the ore and prevent production of a purified aluminum nitrate capable of providing alumina "cell grade" quality.

The nitric acid-ore slurry is then heated to convert the aluminum in the ore to aluminum nitrate and dissolved free $Al_2O_3$ and digested in single or multiple stages at temperatures above about 140° C. preferably between 160° C. and about 220° C. under autogeneous pressure, usually about 80 p.s.i.g. to 250 p.s.i.g. for a period sufficient to completely exhaust the nitric acid in the mixture, leaving a solution comprising aluminum nitrate and an appreciable proportion of free $Al_2O_3$ dissolved in the aluminum nitrate solution. As brought out above, the temperatures are critical for effecting iron removal in a single separation step since we have found that ferric nitrate is unstable in aqueous solution at temperatures above about 140° C., in the presence of ferric oxide and forms nitric acid and hydrated alpha ferric oxide of which the latter is insoluble in the solution. On the other hand, aluminum nitrate in aqueous solution under the same conditions is essentially stable and remains in solution. These relationships are shown graphically in FIGURE 2 of the drawings. Temperatures higher than about 220° C. are preferably avoided as they produce higher vapor pressures and produce higher rates of corrosion than do lower temperatures.

Digestion is continued until no free nitric acid remains in the solution, usually a period between about 15 minutes and about 2 hours residence time at the critical digestion temperature, the time depending somewhat on the temperatures used. Besides dissolving the major proportion of alumina in the ore, the digestion step dissolves substantially all of the alkali and alkaline earth metal compounds as the nitrates. If these impurities are unusually high, it may be desirable to add sufficient additional nitric acid to compensate for its loss in converting these compounds to their nitrates. The amount of nitric acid used, however, should in all cases be less than that theoretically necessary to convert all the alumina to aluminum nitrate after correction for loss due to solution of the alkali and alkaline earth metal compounds. Thus, the amount of nitric acid used in such cases will be sufficient to convert to nitrates, all of the alkali and alkaline earth metal compounds in the ore and in addition, not more than about 98% of the aluminum compounds present.

After completion of the digestion, the solid material is separated from the slurry, after dilution if desired, as by filtration, settling, or centrifugation to remove undissolved silica and precipitated hydrated ferric oxide (red mud). Metallic oxides inert to nitric acid such as titanium dioxide and the like are also removed at this stage.

The resulting aluminum nitrate solution is virtually iron-free, containing less than about the maximum 0.05% iron permitted for cell grade alumina, i.e., a ratio of $Al_2O_3$ to $Fe_2O_3$ greater than 2,000.

In the process of our invention, the simple digestion step serves concomitantly as a means for eliminating iron from high iron content ores and from iron-contaminated aluminum nitrate solutions with no subsequent iron removal steps which have always been necessary in prior art nitric acid processes.

After separation of the purified iron-free aluminum nitrate solution, alumina is recovered therefrom. Preferably the aluminum nitrate solution is concentrated as by evaporation to crystallizing strength preferably to between about 11% and about 12% $Al_2O_3$ content, and then crystallized as $Al(NO_3)_3 \cdot 9H_2O$ and separated from the mother liquor leaving additional impurities, particularly the alkali and alkaline earth metal compounds such as sodium, calcium, magnesium compounds and also other metallic compounds in the mother liquor. The aluminum nitrate crystals are then denitrated to form alumina, $Al_2O_3$, and to recover nitric acid values. In one method of accomplishing this, the crystals are melted at say, about 85° C. in a melt tank, then sprayed as a liquid into a fluid bed of alumina maintained at about 400° C. The resulting partially hydrated aluminum oxide is continuously drawn off into a receiver and is calcined in a rotary kiln at about 1000° C. to about 1250° C. to form cell grade alumina. The mother liquor from the crystallization step is pumped continuously to a second fluid bed of alumina where it is decomposed to liberate nitric acid values. The impure alumina thus produced is discarded. The off gas streams from the two denitration operations are combined, fed to a nitric acid scrubbing tower where nitric acid is recovered at 40–60% concentration which is recycled to the digestion system.

The following specific examples further illustrate our invention. Parts are by weight except as otherwise noted.

EXAMPLE 1

A sample of raw Spanish bauxite having the following analysis:

|  | Percent |
|---|---|
| $Al_2O_3$ | 49.6 |
| $Fe_2O_3$ | 21.0 |
| Silica | 9.2 | thus containing about 0.42 part of $Fe_2O_3$ per part of $Al_2O_3$, was pulverized so as to pass 73% through a 200 mesh Tyler screen. Then 816 grams of the pulverized bauxite were slurried with 2520 grams of 50% nitric acid, equivalent to 85% of the stoichiometric equivalent of the $Al_2O_3$ in the sample. The slurry was heated in an autoclave at 170° C. for about 1.5 hours. The slurry was then diluted with 1000 grams of water, cooled to 90° C. and the slurry was filtered thus producing 3222 grams of a clarified aluminum nitrate liquor assaying 8.71% total $Al_2O_3$, 0.0011% $Fe_2O_3$ and 0.54% free $Al_2O_3$. The undissolved material was washed and the residue, containing, on a dry basis, 14% $Al_2O_3$ and 39.6% $Fe_2O_3$, was discarded. The filtrate plus the washings (1477 grams containing 4.32% $Al_2O_3$ and 0.0003% $Fe_2O_3$), contained a total of 344.3 grams of $Al_2O_3$ which represented 85% alumina yield. Ratio of $Al_2O_3$ to $Fe_2O_3$ equivalent in the combined filtrate was 8600.

In a run similar in all respects to that described above, but in which the bauxite was calcined at 650° C. for two hours, a filtrate was obtained which contained 91.5% of the $Al_2O_3$ in the starting ore and a ratio of $Al_2O_3/Fe_2O_3$ of 6700.

EXAMPLES 2–5

Four samples of bauxite of varying ratio of $Fe_2O_3$ to $Al_2O_3$ were digested with nitric acid as described in Example 1 above except for variations in proportions of nitric acid used in some cases. The bauxites were of the origin and analyses shown in Table I below:

TABLE I.—BAUXITES

| Ex. No. | Origin | Analysis, percent | | | |
|---|---|---|---|---|---|
| | | $Al_2O_3$ | $Fe_2O_3$ | $SiO_2$ | $Fe_2O_3/Al_2O_3$ |
| 2 | Portland, Oregon | 38.6 | 34.4 | 1.26 | 0.9 |
| 3 | Salem, Oregon | 37.0 | 21.5 | 9.7 | 0.58 |
| 4 | Jamaica | 49.4 | 20.2 | 0.85 | 0.41 |
| 5 | "High Grade" Surinam | 61.0 | 0.94 | 2.90 | 0.015 |

After separation of the solid residues obtained in the digestions, the respective filtrates had the analyses shown in Table II below:

filtrate obtained contained a ratio of $Al_2O_3/Fe_2O_3$ of 2200.

TABLE II

| Example No. | 2 | 3 | 4 | 5 |
|---|---|---|---|---|
| Percent Stoichiometric $HNO_3$ used | 71 | 80 | 85 | 81 |
| Total $Al_2O_3$ | 8.0 | 8.06 | 6.0 | 7.75 |
| Free $Al_2O_3$ | 1.3 | 1.00 | 1.0 | 1.30 |
| $Fe_2O_3$ | 0.0018 | 0.0014 | 0.00073 | 0.11 |
| $Al_2O_3/Fe_2O_3$ | 4,450 | 5,760 | 8,200 | 70 |

It will be noted from the tables that Example 5 wherein the ratio of $Fe_2O_3$ to $Al_2O_3$ in the original ore was only 0.015 yielded an aluminum nitrate which had too low an alumina to iron oxide ratio to provide a cell grade alumina.

EXAMPLE 6

To 3860 grams of $Al(NO_3)_3$ liquor resulting from the autoclave nitric acid leaching of Surinam bauxite (0.015 $Fe_2O_3/Al_2O_3$) as in Example 5, containing 0.11% iron and having a ratio of $Al_2O_3$ to $Fe_2O_3$ of 61.7, was added 354 grams of the dry material obtained in Example 1 as a residue from the leaching of Spanish bauxite and containing 40% $Fe_2O_3$ and 15% $Al_2O_3$. The resulting slurry was digested under pressure at 170° C. for one hour and was then filtered. The filtrate was analyzed with results shown below:

| | Liquor Before Digestion, Percent | Filtrate, Percent |
|---|---|---|
| Total $Al_2O_3$ | 6.8 | 6.3 |
| Free $Al_2O_3$ | 1.3 | 1.3 |
| $Fe_2O_3$ | 0.11 | 0.0004 |
| $Al_2O_3/Fe_2O_3$ | 61.7 | 15,700 |

It is apparent from the above example that iron-contaminated aluminum nitrate solution can be purified to yield virtually iron free aluminum nitrate of a purity capable of producing cell grade alumina.

EXAMPLE 7

695 grams of Surinam bauxite of the composition shown in Example 5 above was mixed with 500 grams of dry residue containing 40% $Fe_2O_3$ and 15% $Al_2O_3$ obtained from Spanish bauxite in Example 1, to form a mixture containing 41.8% $Al_2O_3$ and 17.2% $Fe_2O_3$. To the mixture was added 3140 grams of 50% $HNO_3$ and the mass was heated at 170–180° C. for 1.25 hours. The mass was then diluted and filtered and produced a filtrate assaying 0.0026% $Fe_2O_3$ equivalent to an $Al_2O_3/Fe_2O_3$ ratio of 3200.

EXAMPLE 8

100 grams of Georgia kaolin clay containing 36.6% $Al_2O_3$, 0.85% $Fe_2O_3$ and 40% $SiO_2$ were ground to −28 mesh and calcined at 650° C. for one hour. The calcined clay was then mixed with nitric acid of 50% by weight concentration, using 85% of the stoichiometric amount of acid required to convert all $Al_2O_3$ in the clay to aluminum nitrate, and maintained at 90–118° C. under atmospheric pressure for ½ hour. The mass was then diluted and filtered. Analysis of the filtrate showed that 86.1% of the $Al_2O_3$ and 31.5% $Fe_2O_3$ were extracted from the clay. The weight ratio of $Al_2O_3/Fe_2O_3$ in filtrate was 131. A 75 ml. sample of the above filtrate containing 86.2 gm./liter combined $Al_2O_3$; 0.85 g./l. free $Al_2O_3$ and 0.65 g./l. $Fe_2O_3$ was mixed with 2.25 gm. of iron oxide prepared by decomposing C. P. $Fe(NO_3)_3 \cdot 9H_2O$ to $Fe_2O_3$ by heating to 400° C. to form a mixture containing $$Al_2O_3/Fe_2O_3$$

ratio of 2.8 and the mixture was autoclaved at 200° C. for 15 minutes. The resulting mixture was filtered and the

EXAMPLE 9

To 3836 grams of $Fe(NO_3)_3$ solution, containing an equivalent of 666 grams $Fe_2O_3$ and 1580 grams of $HNO_3$, was added 1130 grams calcined Arkansas high silica kaolin clay, containing 44.3% $Al_2O_3$, 2.1% $Fe_2O_3$ and 39.0% $SiO_2$. The amount of $Al_2O_3$ added in the clay, 500 grams, was such that the equivalent $HNO_3$ content of the $Fe(NO_3)_3$ solution was 85% of stoichiometric with respect to the $Al_2O_3$ content of the clay. The resulting slurry was digested for six hours at 170° C. and then filtered. The filtrate was analyzed with results shown below:

| | Slurry Before Digestion, Percent | Filtrate, Percent |
|---|---|---|
| Total $Al_2O_3$ | 10.05 | 8.20 |
| Free $Al_2O_3$ | 10.05 | 0.38 |
| $Fe_2O_3$ | 13.87 | 0.0017 |
| $Al_2O_3/Fe_2O_3$ | 0.725 | 4,820 |

It is apparent from the above example that $Fe(NO_3)_3$ liquor can be used to digest alumina bearing ores to produce a virtually iron free aluminum nitrate of a purity capable of producing cell grade alumina.

EXAMPLE 10

A bauxite sample containing 57.5% of alumina and an $Al_2O_3/Fe_2O_3$ ratio of 8/1 ($Fe_2O_3$:$Al_2O_3$ of 0.125) was mixed with a quantity of 40% aqueous nitric acid solution equivalent to 59.3% of the stoichiometric equivalent of the $Al_2O_3$ in the bauxite, and the mixture was digested for six hours at 170° C. The slurry was then filtered and produced an aluminum nitrate solution having an $$Al_2O_3/Fe_2O_3$$

ratio of 2570 with a yield of 77.2% of the alumina in the original ore.

EXAMPLE 11

Ground bauxite ore of about −80 mesh, Tyler, containing 50% $Al_2O_3$, 20% $Fe_2O_3$, 9% $SiO_2$, the balance other impurities, including about 1.5% $TiO_2$ and substantially less than 1% each of sodium, calcium, magnesium, manganese, nickel, copper and chromium compounds, is continuously fed, together with 60% nitric acid solution to a premix tank in the ratio of 2.63 parts by weight of nitric acid solution per part by weight of bauxite, equivalent to a ratio of 5 mols $HNO_3$ per mol of $Al_2O_3$. The resulting slurry is continuously fed to a compartment digester vessel equipped with agitators wherein the temperature of the mix is raised to 176° C. and maintained at this temperature during progression of the slurry through the digester during a residence time of about 2.5 hours. The digested slurry, now containing no free nitric acid and containing about 48.9% aluminum nitrate and 2% free $Al_2O_3$ in solution, 5.5% $Fe_2O_3$ and 3.3% $SiO_2$ in suspension, the balance water, small proportions of other water-soluble nitrates and inert solid impurities, is fed to a dilution tank, diluted and cooled with 52° C. water or preferably with wash water from the subsequent washing of the filtered or decanted solid "mud," dilution being in the ratio of about 1 part dilution water to 1 part of slurry by weight. The diluted slurry is then fed to a classifier or thickener where the aluminum nitrate solution is settled and separated by a Dorr thickener, from the insoluble solids (red mud), containing undissolved silica, iron and other solid impurities. The solid material from the thickener is reslurried and settled one or more times to recover the entrained soluble alumina values in the red mud, and the wash water used in the dilution of slurry from the digester.

The liquid filtrate from the thickener, containing about 33.3% aluminum nitrate, is concentrated to about 47.5% aluminum nitrate and is crystallized to $Al(NO_3)_3 \cdot 9H_2O$ in a two stage vacuum crystallizer. The resulting pure crystals (90% of the original feed) are remelted and fed to a denitration stage. The mother liquid (10% of original feed) is in part recycled and in part bled off and denitrated separately and the residue is discarded thus eliminating substantially all impurities not removed with the digest mud.

The $Al(NO_3)_3 \cdot 9H_2O$ melt is decomposed by spraying it on a bed of partially hydrated alumina particles in a fluid bed reactor. The alumina formed is withdrawn continuously from the denitrators at 600° F. (325° C.) and sent to the calcining operation. The decomposition gas is further processed to recover its heat value as 45 p.s.i.g. steam to drive the crytallization stage and to recover its nitric acid values.

The hot nitric oxide and water vapors from the denitrators are passed to a bubble cap tower from which 60% nitric acid is withdrawn from the bottom and 45 p.s.i.g. steam withdrawn from the top. After use in the crystallizer, the condensate is returned to the tower while the non-condensibles are sent to a second tower to recover the nitric oxides as weak acid. This weak acid is returned to the first tower.

The hot alumina is calcined at 2300° F. (1260° C.) in a rotary kiln. The product alumina is cooled by a fluidized bed cooler and then sent to storage. Analysis shows this product to contain less than 0.02% $Fe_2O_3$ and to meet all the specifications for "cell grade" alumina.

In Table III below is shown the percentages of impurities in the aluminum nitrate digest liquor and in the final calcined cell grade alumina product obtained in the above example, based on 100% $Al_2O_3$, in comparison with the percentages of the same impurities in the original bauxite.

TABLE III.—PERCENT IMPURITIES, 100% $Al_2O_3$ BASIS

| Impurity | Bauxite | $Al(NO_3)_3$ Digest Liquor | Calcined $Al_2O_3$ |
|---|---|---|---|
| $SiO_2$ | 18 | .05 | .007 |
| $Fe_2O_3$ | 40 | .015 | .008 |
| Mg | 1.0 | .70 | .010 |
| Mn | 1.0 | .50 | .003 |
| Ni | 0.16 | .20 | .001 |
| Na | .02 | .02 | .001 |
| Ca | .40 | .60 | .015 |
| Cr | .20 | .05 | .005 |
| Cu | .02 | .015 | .008 |
| Ti | 3.0 | .01 | .001 |

While the above describes the preferred embodiments of our invention, it will be understood that departures may be made therefrom within the scope of the specification and claims.

We claim:
1. The process for producing substantially iron-free aluminum nitrate solutions having a ratio of $Al_2O_3$ to $Fe_2O_3$ of at least about 2,000 from low grade aluminous ores which comprises continuously digesting an aluminous ore containing between about 6% and about 60% alumina, and iron in a quantity equal to between about 0.10 part and about 1.5 parts $Fe_2O_3$ per part of $Al_2O_3$ by weight, the balance being primarily silica, together with minor proportions of other metallic compound impurities, with aqueous nitric acid solution of concentration between about 30% and about 60% at temperatures between about 140° C. and about 220° C. under autogenous pressure, the amount of nitric acid used being between about 50% and about 98% of the amount theoretically required to convert all the alumina in the ore to aluminum nitrate, and continuing the digestion until no free acid remains in the solution, thereby obtaining an aluminum nitrate solution having a ratio of $Al_2O_3$ to $Fe_2O_3$ of at least about 2,000.

2. A process for producing substantially iron-free aluminum nitrate solutions having a ratio of $Al_2O_3$ to $Fe_2O_3$ of at least about 2,000 from low grade aluminous ores which comprises digesting an aluminous ore containing between about 6% and about 60% alumina, iron and in a quantity equivalent to between about 0.10 part and about 1.5 parts $Fe_2O_3$ per part $Al_2O_3$ by weight, the balance being primarily silica and other metallic oxides inert to nitric acid, together with small proportions of alkali and alkaline earth metal compounds, with aqueous nitric acid solution of concentration between about 30% and about 60% at temperatures between about 140° C. and about 220° C. under autogenous pressure, the amount of nitric acid used being an amount theoretically sufficient to convert to nitrates all the alkali and alkaline earth metal compounds present and additionally between about 50% and about 98% of the amount theoretically required to convert all the alumina in the ore to aluminum nitrate, continuing the digestion until no free nitric acid remains in the solution, and thereafter removing precipitated silica and iron oxide from the solution thereby obtaining an aluminum nitrate solution having a ratio of $Al_2O_3$ to $Fe_2O_3$ of at least about 2,000.

3. The process for producing substantially iron-free aluminum nitrate solutions having a ratio of $Al_2O_3$ to $Fe_2O_3$ of at least about 2,000 from low grade aluminous ores, which comprises digesting an aluminous ore containing an alumina content between about 6% and about 60%, and iron in a quantity equivalent to between about 0.1 part and about 1.5 parts $Fe_2O_3$ per part $Al_2O_3$, by weight, the balance being primarily silica and other metallic oxides inert to nitric acid, together with minor proportions of other metallic compound impurities, with aqueous nitric acid of about 30% to about 60% concentration, at temperatures between about 160° C. and about 220° C. under autogenous pressure, the amount of nitric acid used being between about 50% and about 90% of the amount theoretically required to convert all the alumina in the ore to aluminum nitrate, continuing the digestion until no free nitric acid remains in the solution, and thereafter removing precipitated silica and iron oxide from the solution, thereby obtaining an aluminum nitrate solution having a ratio of $Al_2O_3$ to $Fe_2O_3$ of at least about 2,000.

References Cited

UNITED STATES PATENTS

| | | | |
|---|---|---|---|
| 1,421,804 | 7/1922 | Mejdell | 23—102 |
| 1,652,119 | 12/1927 | Halvorsen et al. | 23—142 |
| 1,792,410 | 2/1931 | Buchner | 23—102 X |
| 2,907,633 | 10/1959 | Seidel et al. | 23—102 X |
| 3,211,524 | 10/1965 | Hyde et al. | 23—141 |
| 3,240,561 | 3/1966 | Brown | 23—102 X |

FOREIGN PATENTS 7,951   6/1963   Japan.

OTHER REFERENCES

Chem. Ab., vol. 60, p. 3772–b.

EARL C. THOMAS, *Primary Examiner.*

OSCAR R. VERTIZ, *Examiner.*

G. T. OZAKI, *Assistant Examiner.*